United States Patent
Buley et al.

(10) Patent No.: US 7,059,663 B1
(45) Date of Patent: Jun. 13, 2006

(54) PROTECTIVE WIND SHIELD APPARATUS

(76) Inventors: Gloria Marie Buley, 253 Mountain Rd., Shokan, NY (US) 12481; Wesley Alvah Buley, 253 Mountain Rd., Shokan, NY (US) 12481

( * ) Notice: Subject to any disclaimer, the term of this patent is extended or adjusted under 35 U.S.C. 154(b) by 0 days.

(21) Appl. No.: 11/208,493

(22) Filed: Aug. 22, 2005

(51) Int. Cl.
*B60J 1/20* (2006.01)
(52) U.S. Cl. ..................... 296/180.1; 116/52
(58) Field of Classification Search ............ 296/180.1, 296/84.1, 91, 1.04; 359/868, 864; 340/433; 116/28 R, 43, 51, 52
See application file for complete search history.

(56) References Cited

U.S. PATENT DOCUMENTS

| | | | | |
|---|---|---|---|---|
| 5,094,502 A | * | 3/1992 | Mote | ........................ 296/180.1 |
| 5,150,941 A | * | 9/1992 | Silzer et al. | .............. 296/180.1 |
| 5,281,948 A | * | 1/1994 | Estrada | ........................ 340/433 |
| 6,099,933 A | * | 8/2000 | Lamparter | .................... 428/99 |
| 6,213,047 B1 | * | 4/2001 | Means et al. | .............. 116/28 R |

\* cited by examiner

*Primary Examiner*—Jason Morrow
(74) *Attorney, Agent, or Firm*—McAndrews, Held & Malloy, Ltd.

(57) ABSTRACT

The present invention relates to a shield for retractable devices that are part of or attached to vehicles, such as school buses, to protect the retractable device from damage or destruction from air movement. While such retractable devices are bolted or otherwise securely fastened to the vehicle, the retractable devices are susceptible to being damaged or torn off of the vehicle due to air movement such as headwinds, wind gusts, and turbulence from passing vehicles. The current invention overcomes the susceptibility to damage of the retractable devices from air movement by shielding the retractable device from such air movement. The current invention may include a shock absorber assembly to minimize or eliminate noisy vibration from the shield. As such, the present invention provides protection for retractable devices on vehicles from air movement with minimal additional noise.

2 Claims, 5 Drawing Sheets

PROTECTIVE WIND SHIELD APPARATUS

BACKGROUND OF THE INVENTION

This invention relates to school buses and other vehicles and is directed to protecting devices that project out from the vehicle from being damaged or torn from the vehicle. It is more particularly directed to protecting retractable devices on buses from being damaged by air movement while the bus is in motion.

BRIEF SUMMARY OF THE INVENTION

Buses or other vehicles often have devices such as stop signs, mirrors, or other devices that project out from the vehicle during its operation. Many of these devices are retractable and are extended as needed to provide full functionality. These devices may be part of the original vehicle design or they may be installed after the vehicles are manufactured. Use of these devices may be mandated by legislation or operational procedures for safety or proper functioning of the vehicle.

A persistent problem involves damage to these devices from air movement, primarily while the vehicle is in motion. Some forms of damaging air movement are the headwind created by the motion of the vehicle, wind gusts, or turbulence from passing vehicles. In many instances, the air movement causes the device to be torn off of the vehicle. This not only creates an immediate safety hazard at that point in time, but it leads to decreased safety or functionality of the vehicle until the device is repaired or replaced. In addition, there is increased vehicle downtime for repairs, scheduling difficulties as other vehicles must fill in during the downtime, and increased maintenance costs.

To prevent damage to or destruction of these important devices, the applicant has developed a wind shield assembly that protects the device on the vehicle from air movement. The wind shield assembly consists of a shield made of a rigid or semi-rigid material, a shock absorber assembly, and a mounting device for attaching the shield to a vehicle. The wind shield assembly may also consist of a retractable device such as the stop sign and mirror assembly embodiment proposed by the applicant in a co-pending patent application, Publication Number US 2005/0099707 A1, the entirety of which is incorporated by reference herein. The protection provided by the wind shield assembly allows vehicles to travel at required speeds under varying wind conditions while permitting reliable deployment of the devices as needed.

It is an object of the present invention to prevent damage from air movement to retractable devices on school buses and other vehicles.

It is another object of the present invention to reduce unsafe operation of school buses and other vehicles due to damaged or missing safety devices.

It is a further object of the present invention to reduce the maintenance costs for school buses and other vehicles.

It is a still further object of the present invention to make use of a shield to protect retractable devices on school buses and other vehicles from air movement.

It is a still further object of the present invention to make use of a shock absorber assembly to minimize rattling of the shield device when it is subjected to air movement.

Other aspects, advantages and novel features of the present invention may be further understood by reference to the following detailed description of illustrated embodiment(s) of the invention taken in conjunction with the accompanying drawings.

DETAILED DESCRIPTION OF THE INVENTION

Figure 1:
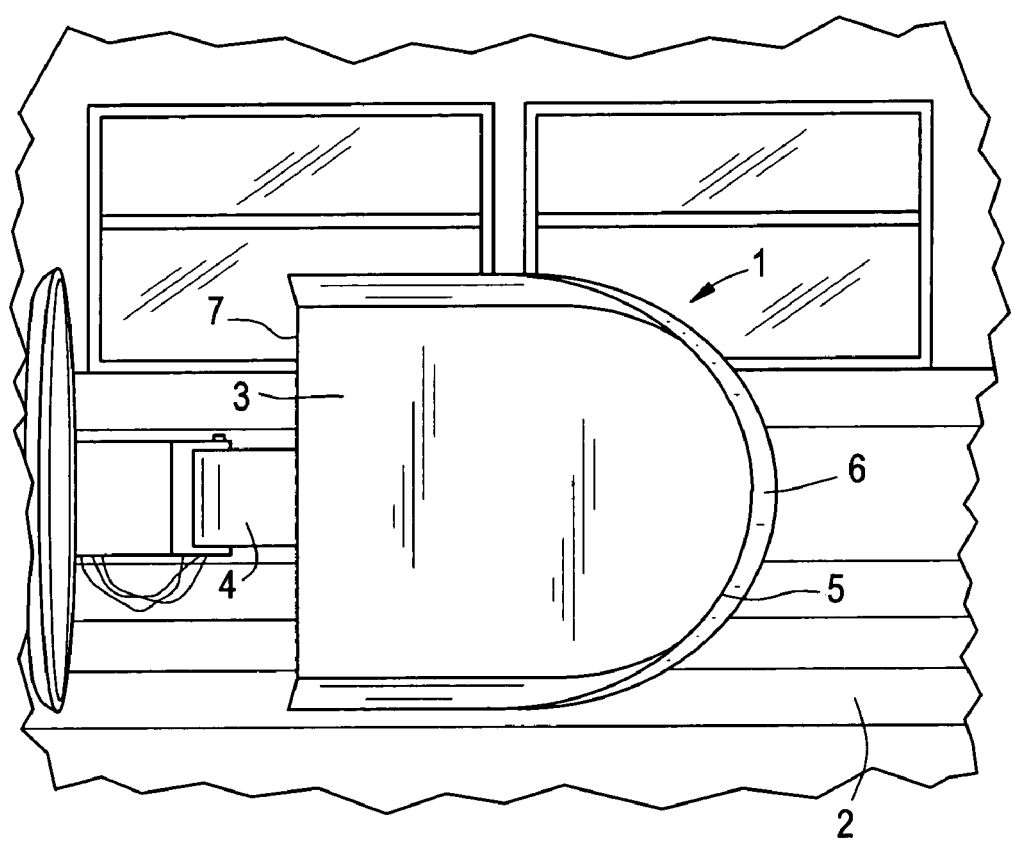
FIG. 1 shows a front view of an embodiment of the present invention attached to a vehicle with a mounting bracket.

FIG. 1 shows an embodiment of the wind shield assembly 1 attached to a vehicle 2. The shield 3 is made of a rigid or semi-rigid material, such as plastic, and is attached to the vehicle 2 with a mounting bracket 4. The shield 3 has a curved surface 5 with a projecting lip 6 oriented towards the front of the vehicle 2 to provide a barrier against air movement. The shield 3 has a straight surface with no lip 7 oriented towards the rear of the vehicle.

Figure 2:
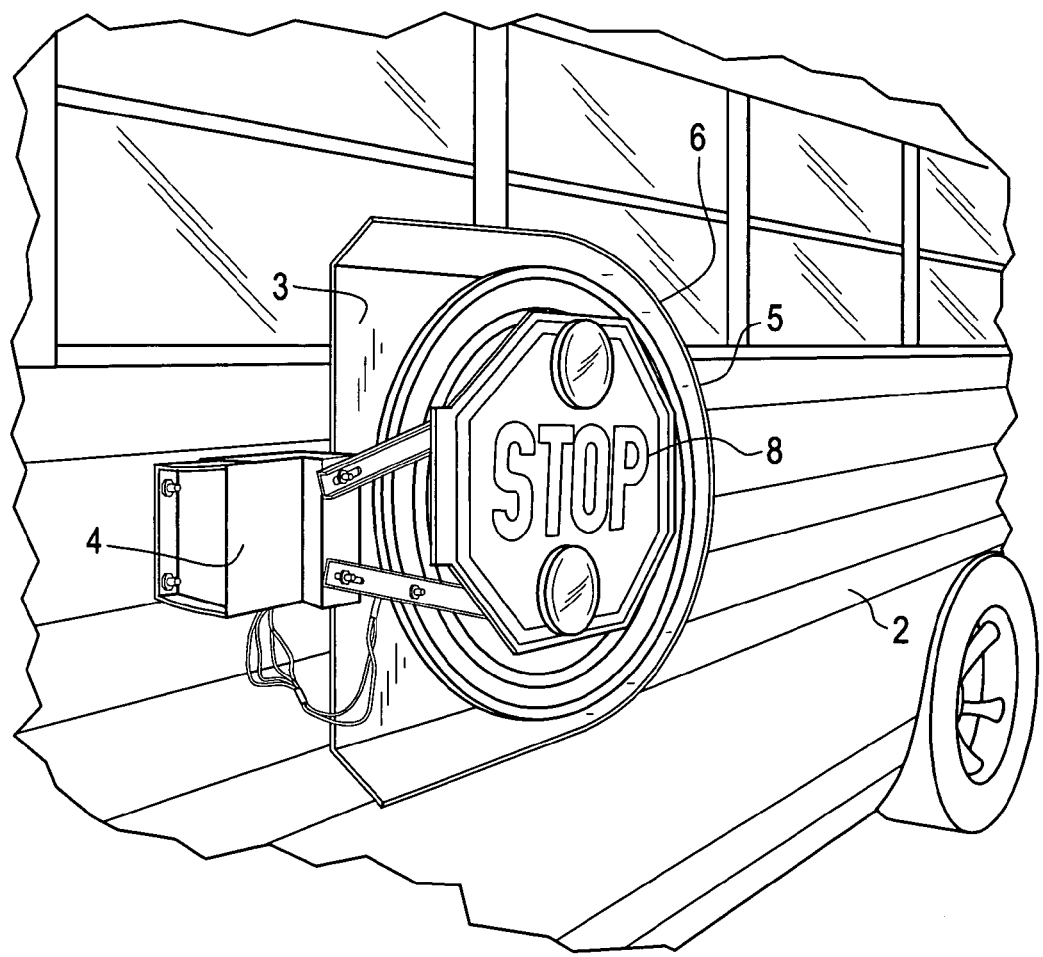
FIG. 2 shows an angled front view of a retractable device nested in an embodiment of the present invention and attached to a vehicle with a mounting bracket.

FIG. 2 shows an embodiment of a retractable device 8, namely the stop sign/mirror apparatus generally disclosed in Applicant's aforementioned co-pending application, attached to a vehicle 2 with a mounting bracket 4 and nested inside the shield 3 in a fully retracted position. It is preferred that the depth of the projecting lip 6 of the curved surface 5 exceed the depth of the retractable device 8 to insure proper protection from air movement.

Figure 3:
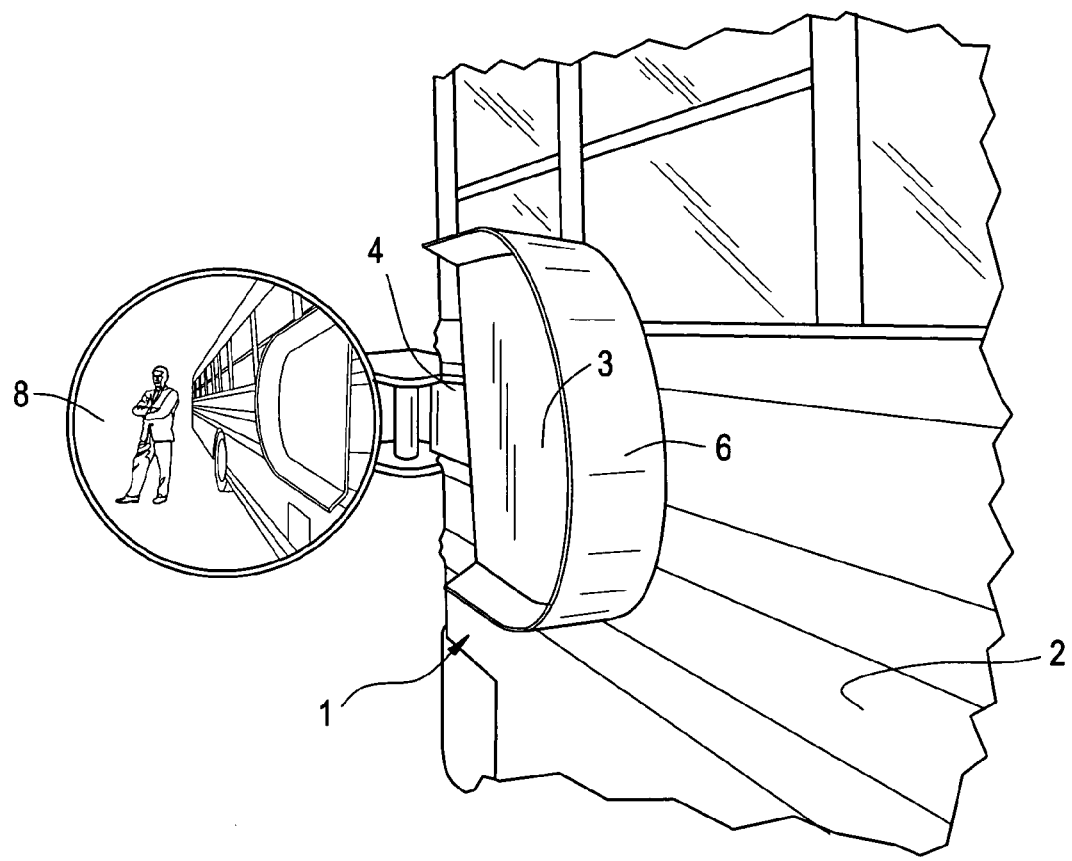
FIG. 3 shows a side view of an embodiment of the present invention attached to a vehicle with a mounting bracket and a retractable device in a fully extended position.

FIG. 3 shows the embodiment of the retractable device 8 from FIG. 2 projecting out from the wind shield assembly 1 in the fully extended position. Both the shield 3 and the retractable device 8 are attached to a vehicle 2 with a mounting bracket 4. FIG. 3 also shows a side view of the projecting lip 6 of the shield 3.

Figure 4:
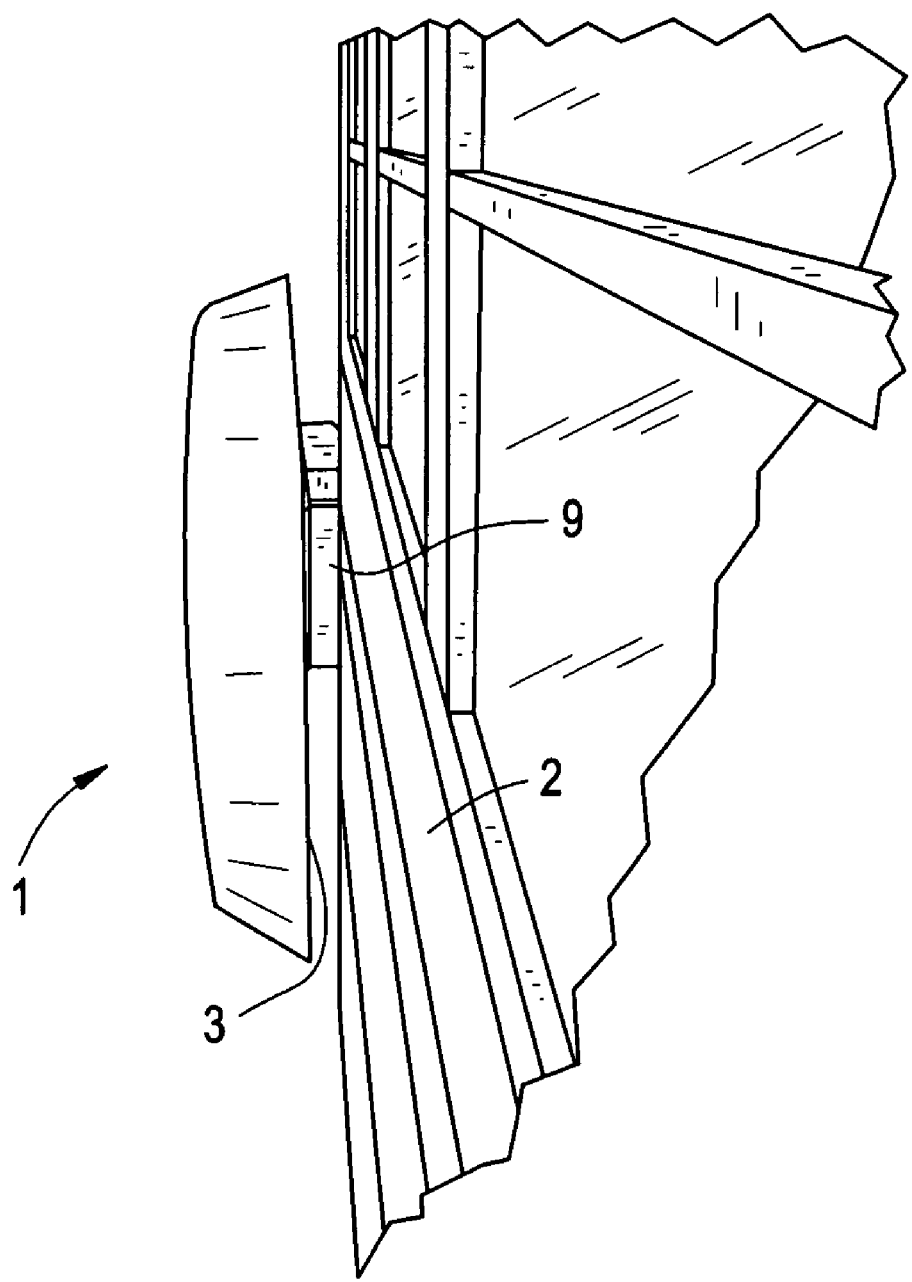
FIG. 4 shows a side view of an embodiment of the present invention, including a shock absorber assembly mounted between the shield and the vehicle.

FIG. 4 shows a side view of an embodiment of the wind shield assembly 1 attached to a vehicle 2. FIG. 4 also shows an embodiment of the shock absorber assembly 9 that is mounted between the back of the shield 3 and a vehicle 2. The shock absorber assembly 9 is intended to minimize noisy vibrations of the shield 3 when air movement is present. The effectiveness of the shock absorber assembly was confirmed by testing conducted near Pine Hill, N.Y. by driving the bus down a long steep mountain hill at full throttle against a strong headwind having gusts exceeding 20 mph. (The hill in question is so steep that a commercial transit bus can reach a maximum speed of only 20 mph going up hill.) A speedometer reading of 68 mph was reached during acceleration over 45 seconds down that long hill. The estimated effective wind speed experienced at the wind shield assembly was close to 90 mph, substantially exceeding any possible conditions in normal safe use of a school bus. Observers on the bus reported that the wind shield assembly did not separate from the side of the bus during the tests, indicating that the wind shield assembly is adequate for all normal speeds and winds. Also, no slapping or other sound was heard by the observers, indicating that the shock absorber design was more than adequate to prevent noisy vibrations of the wind shield assembly.

Figure 5:
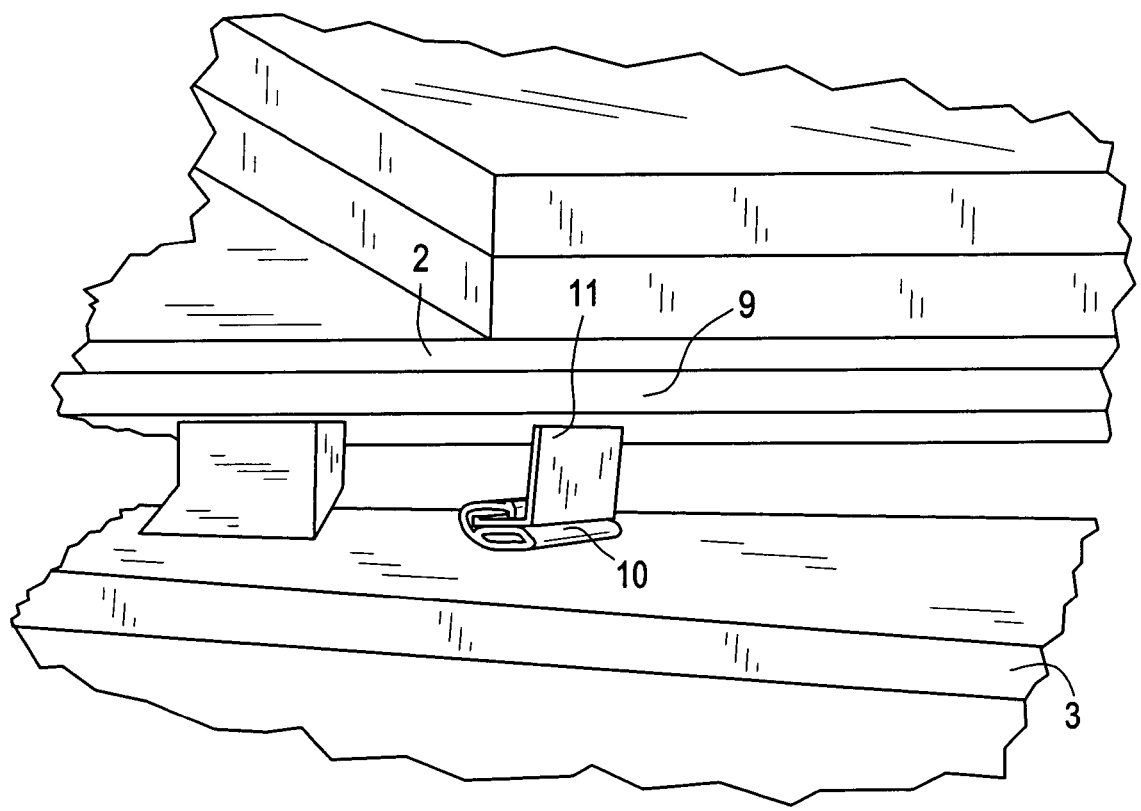
FIG. 5 shows a top view of an embodiment of an exemplary mounting bracket and shock absorber assembly mounted between the shield and the vehicle.

FIG. 5 shows a top down view of an embodiment of the shock absorber assembly 9 that is mounted between the back of the shield 3 and a vehicle 2. The shock absorber assembly 9 in this embodiment consists of an elastomeric material 10 mounted to a brace 11 that is attached to the vehicle 2. The elastomeric material 10 is between the brace 11 and the back of the shield 3 and it is intended to absorb the vibrations of the shield 3 caused by air movement.

While several embodiments of the invention have been described hereinabove, those of ordinary skill in the art will recognize that these embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, it is the intention of the inventors to embrace herein all such changes, alterations and modifications which come within the meaning and range of equivalency of the claims.

The invention claimed is:

1. A wind shield assembly for protecting a retractable device on a vehicle comprising:
    a shield having a front end and a back end, the front end having a projecting lip that extends outwardly from the shield to at least partially surround the retractable device;
    a mounting bracket for mounting the shield to the vehicle; and
    a shock absorber assembly.

2. A wind shield assembly for protecting a retractable device on a vehicle comprising:
    a shield having a projecting lip that extends outwardly from the shield to at least partially surround the retractable device, wherein the depth of the projecting lip is at least as great as the depth of the retractable device;
    a mounting bracket for mounting the shield to the vehicle; and
    a shock absorber assembly connected to the vehicle to limit vibrational noise from the shield while the vehicle is in motion.

* * * * *